J. L. Knowlton.
Circular-Saw Mill.
Nº 73536    Patented Jan. 21, 1868.

Witnesses.                          Inventor.

United States Patent Office.

JOHN L. KNOWLTON, OF PHILADELPHIA PENNSYLVANIA.

Letters Patent No. 73,536, dated January 21, 1868.

---

IMPROVEMENT IN CIRCULAR-SAW MILLS.

---

The Schedule referred to in these Letters Patent and making part of the same.

---

TO ALL WHOM IT MAY CONCERN:

Be it known that I, JOHN L. KNOWLTON, of the city and county of Philadelphia, and State of Pennsylvania, have invented a new and improved Machine for Sawing Ship-Timber; and I do hereby declare the following to be a clear, exact, and full description of the same, reference being had to the accompanying drawings, forming part of this specification, and in which—

Figure 1:
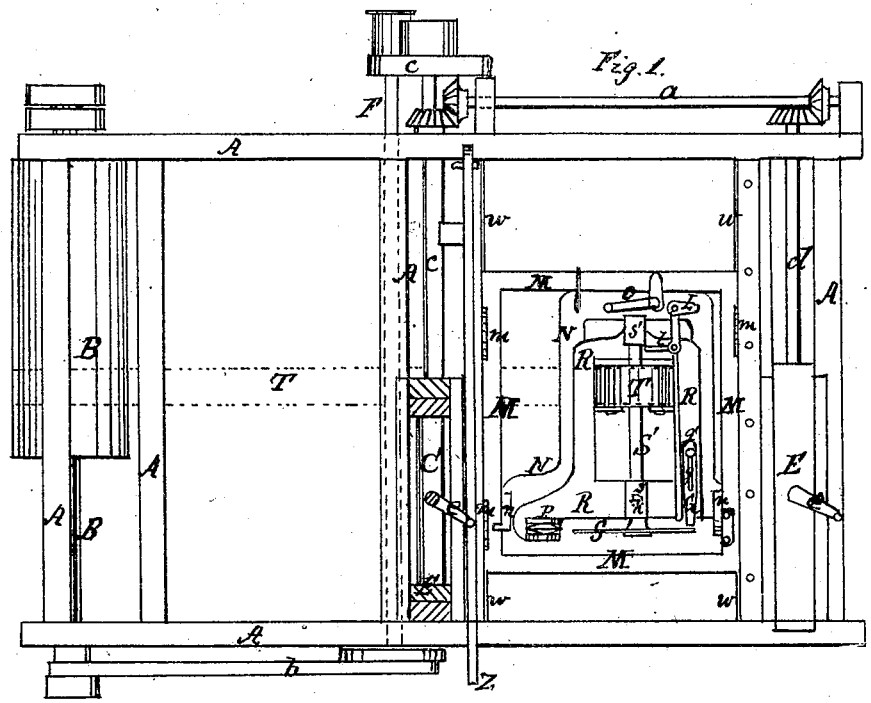
Figure 1 represents a top view of my invention.
Figure 2:
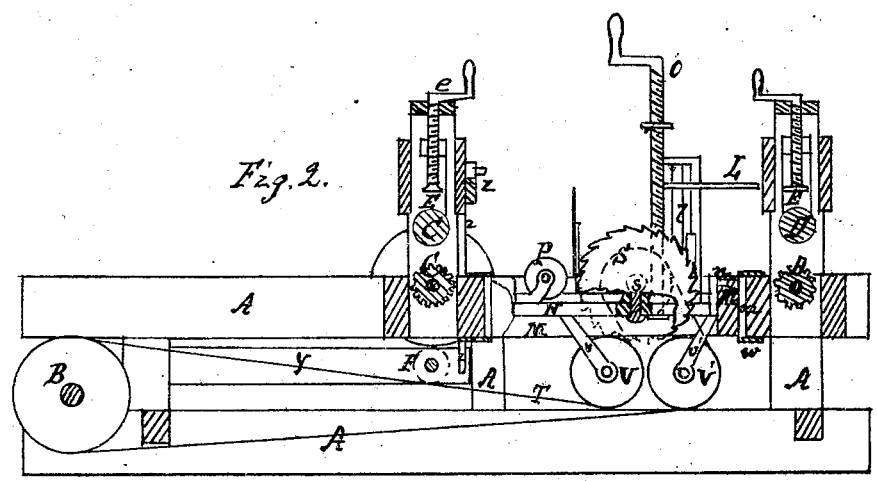
Figure 2 is a longitudinal vertical section of the same.

In this invention the saw is supported by a yoke which allows it to be inclined in any direction, vertical or horizontal, for the purpose of changing the direction or inclination of the cut. The yoke is attached to a carriage which feeds the saw to the log, the latter simply moving backward and forward in the same line for all the different cuts.

In the drawings, A A represent the frame of my sawing-machine, B represents the driving-shaft, and C C' D D' are the feed-rollers, the upper ones, in each set C' D', being held in vertically-adjustable frames E E' regulated by a set-screw, $e$, and the lower ones in each set C D rotating on shafts $c\ d$, connected together by a side shaft, $a$, and receiving their power from the driving-shaft B, through the agency of an intermediate driving-shaft, F, connected with the shaft B by a belt, $b$, and with the shaft $c$ by a belt, $c$, all the belt-shafts being, of course, provided with suitable pulleys or drums. The object of the connecting side shaft $a$ gearing with the shafts $c\ d$, by mitre-gear wheels, is to impart the same amount of motion in the same direction to those two shafts and their feed-rollers C D, upon which the log rests, and is carried backward and forward. The rollers C D are corrugated in order to hold the log more firmly and prevent its slipping. Running directly across the machine, from side to side of the frame A, between the feed-rollers C D, are two parallel ways, $w\ w$, upon which, on trucks $m\ m$, runs a carriage, M, bearing the saw S and its adjusting-apparatus. By means of this carriage the saw can be fed to the log without the necessity of handling the latter. The carriage M supports a yoke-frame, N, hinged to the carriage at the end nearest to the saw by hinges $n\ n$, and at its opposite end supported by an adjusting-screw rod, O, by which it can be caused to take any required inclination to the carriage-frame. Above this yoke-frame, and resting upon it, is another yoke-frame, R, of similar shape, and pivoted to the yoke N by a vertical pivot, $r$, directly under the bearing $s$ of the saw-mandrel S' nearest to the saw. This arrangement enables the saw, the mandrel of which bears in boxes $s\ s'$ fixed to the yoke R, to be turned in different directions by moving the yoke R horizontally on its pivot. A lever, L, with a connecting-rod, $l$, furnishes the means by which the yoke can thus be moved instantly when it is required to change the direction of the saw-cut. This comprises all the arrangements necessary to regulate the position and cut of the saw, to make it cut at any inclination or bevel, in any direction, and at any thickness of cut, and to enable the operator to change the direction, inclination, and feed of the saw, at pleasure. At the heel of the saw is a wedge-roller, P, for the usual purpose of widening the kerf. The journals of the wedge-roller bear in lugs projecting upward from the yoke R, and therefore it always maintains the same relative position to the saw. The wedge-roller also has a lateral movement on its journals to accommodate the turning of the saw.

In order to prevent the belt T from running off of the drum T', by which motion is imparted to the saw-mandrel from the main working-shaft, and to keep it at the proper tension, two small pulleys or drums, V V', are provided, bearing in lugs, $v\ v'$, depending from the under side of the lower yoke N. The belt passes over these pulleys and around the drum T', in the manner shown in the drawing, running between the lugs $v\ v'$, by which it is held in place, and running within the sides of the yokes. The total distance traversed by the belt T will therefore be constant, whatever be the position of the mandrel and saw, and the tension of the belt will always be equal.

As it is not desirable that the feed-rollers should always be in motion, the shaft F, by which they are put in motion, as above described, bears at one end in a beam, Y, pivoted at its rear end to the frame A, and connected at its forward end by means of a connecting-rod, $z$, to a lever, Z. By the lever Z, the belt $c$ may be tightened so as to work the feed-rollers, or slacked so as to impart no motion to them.

Having thus described my invention, what I claim as new, and desire to secure by Letters Patent, is—

1. The combination and arrangement of the carriage M and yokes N and R, or their equivalents, the latter bearing the circular saw S, when the parts are so constructed and arranged that the yoke R rests upon the yoke N, and the latter is pivoted to the carriage, so that the saw can be moved to and from the log, or inclined in any direction, the carriage being at liberty to move back and forth as the inclination of the saw may require, and without the aid of any mechanical arrangements, substantially in the manner and for the purpose specified.

2. The combination of the wedge-roller P with the yoke R, and constructed with lateral movement in such a manner as to allow angular movement of the saw-mandrel without disturbing its relative position with the log.

JOHN L. KNOWLTON.

Witnesses:
C. B. POTTENGER,
JOSEPH A. TURNBULL.